Nov. 11, 1941.   C. D. GARRETSON   2,262,228
SOLDERED NIPPLE COUPLING
Filed Dec. 12, 1939
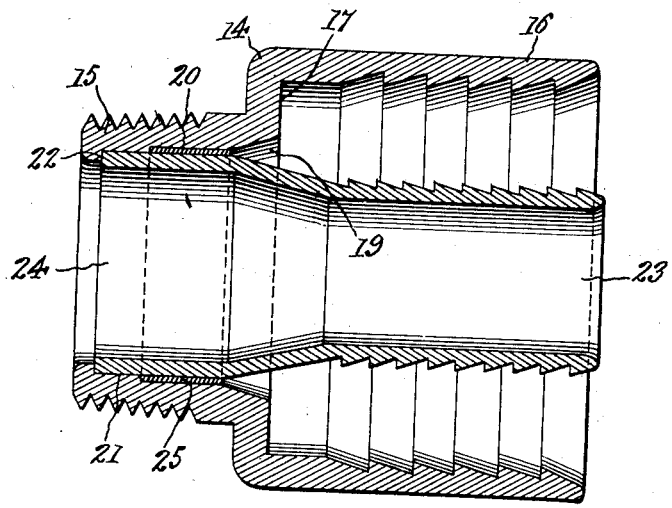
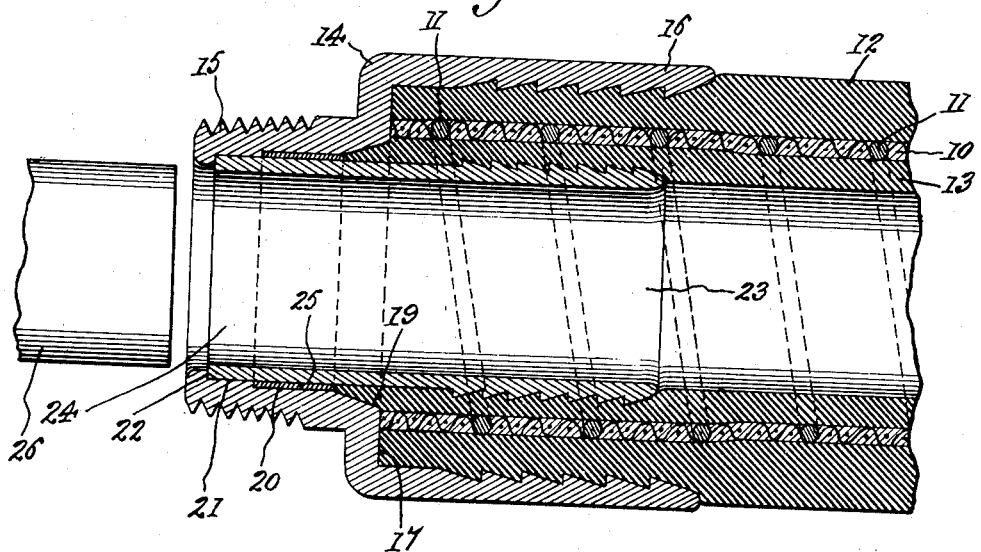
Inventor
Cornelius D. Garretson
By Mawhinney & Mawhinney
Attorneys.

Patented Nov. 11, 1941

2,262,228

UNITED STATES PATENT OFFICE 2,262,228

SOLDERED NIPPLE COUPLING

Cornelius D. Garretson, Wilmington, Del., assignor to Scovill Manufacturing Company, Waterbury, Conn., a corporation of Connecticut Application December 12, 1939, Serial No. 308,877

7 Claims. (Cl. 285—84)

The present invention relates to hose couplings, and has for an object to provide a coupling with a nipple which is soldered therein so that, after use, the nipple may be removed from the body of the coupling and the latter may be reused from time to time.

Another object of the present invention is to provide a soldered nipple coupling of this type wherein the nipple is closely and tightly fitted in the body of the coupling near the outer end of the latter to form a seal against the escape of solder which is flowed into position between the nipple and the body of the coupling; wherein the complete coupling is provided with a nipple which has a drive fit in the body to provide an effective seal against passage of solder; and wherein the solder provides an effective seal against the passage of fluid, such as gasoline and oil, to the end of the hose in the coupling so that the latter is protected by the sealed nipple.

Another object of the present invention is to incorporate in a coupling structure of this character an undercut annular groove or recess into which the inner layer portion of the hose may be axially expanded and deformed so that, as the nipple is finally expanded, this expanded and projected portion of the hose is pinched between the adjacent surfaces of the nipple and body portion of the coupling and effectively sealed against the end of the solder holding the nipple in place.

With the foregoing and other objects in view, the invention will be more fully described hereinafter, and will be more particularly pointed out in the claims appended hereto.

In the drawing, wherein like symbols refer to like or corresponding parts throughout the several views:

Figure 1 is a longitudinal section taken centrally through a soldered nipple coupling embodying the features of the present invention, and Figure 2 is a similar view but with the end of a hose secured in the coupling in expanded relation, the view also showing a punch ready for application through the outer end of the body portion for removal of the nipple to release the coupling from the hose.

Referring now to the drawing, this coupling is adapted for use upon various types of hose, and in the present instance is shown as applied to a length of hose adapted to receive gasoline, oil and the like therethrough. The hose comprises an inner carcass 10 which may be composed of fabric and a spirally wound wire 11. The carcass with the wire therein extends throughout the length of the hose and provides an electrical conductor between the couplings at the opposite ends of the hose. The hose is provided with an outer body part or tube 12 which surrounds the carcass, and is also provided with an inner liner or tube part 13 which is disposed about the inner side of the carcass so as to enclose the latter in the hose, the carcass reinforcing the outer and inner layers or portions of the hose in the well known manner.

As shown in Figure 1 the coupling comprises a body member 14 provided at its outer end, relatively to its position on the end of a hose, with an externally threaded spud 15 and provided at its inner end with an enlarged sleeve 16 adapted to engage over the end portion of the hose, as shown in Figure 2. The inside wall of the sleeve 16 may be provided with any suitable threads, corrugations or the like, and is shown in the present instance as provided with buttress type threads adapted to engage the outer surface portion of the hose and assist in holding the latter from pulling out of the sleeve after the hose has been forced into place therein.

The body portion 14 is provided with an abutment shoulder 17 against which the end of the hose is adapted to engage. The inner marginal portion of the shoulder 17 terminates in an inwardly and axially flaring annular recess 19 adapted to receive the inner tube part 13 of the hose when the latter is compressed and expanded axially outward during the expansion of the coupling.

It will be noted, particularly from Figure 2, that the depth of the shoulder 17 is such that the shoulder is equal substantially to the depth of the outer tube 12 and the carcass 10 of the hose when the latter is expanded and compressed. It will also be noted that the converging walls of the flaring recess 19 slope gradually and entrap and confine the inner tube portion 13 of the hose as it is compressed and deformed.

Immediately outward of the recess 19, the body portion 14 of the coupling is provided with an annular recess or pocket 20, the latter extending toward the outer end of the coupling where the pocket 20 terminates in an annular seat 21, of less internal diameter than that of the wall of the pocket 20, and which terminates at the outer end of the coupling body in a rearwardly facing shoulder 22. The shoulder 22 comprises the bottom of the annular seat 21 and may be only of slight width for the purpose which will later appear.

Removably positioned in the coupling body 14 is an expansible nipple 23. The nipple 23 has an initially reduced body portion substantially coextensive with the sleeve 16 and which has external threads, ribs or the like adapted to engage the inner wall of the hose, as shown in Figure 2. The intermediate portion of the nipple 23 flares gradually and provides the inner wall of the recess 19. The intermediate flaring portion of the nipple terminates in a cylindrical outer end 24 which is proportioned to have a drive fit into the annular seat 21 and which, when seated, engages the shoulder 22. The shoulder 22 is of less width than the thickness of the outer end 24 of the nipple so that, as shown in Figure 2, a punch 26, or other suitable implement, may be introduced into the outer end of the body portion 14 and engaged against the protruding or exposed portion of the end wall of the outer extremity 24 of the nipple 23 to drive the latter inwardly from the annular seat 21.

When the nipple 23 is driven into its seat 21, a layer of solder 25, or other suitable joint material, may be poured into the inner open end of the recess 19 sufficiently to fill the pocket 20 about the outer end 24 of the nipple to secure and retain the nipple in the seat 21 until extra force is applied, such as through the tool 26 to break the bond between the solder and the nipple. Care must be exercised to fill the pocket 20 only with the solder and to leave the annular flaring recess 19 free for the reception of the expanded and deformed inner layer portion of the hose.

In the use of the coupling the end of the hose is introduced into the sleeve 16 and over the nipple 23, the latter engaging in the bore of the hose. After the hose has been worked up into the coupling as far as possible against the shoulder 17, the expander tool, which has previously been introduced in the ordinary manner into the hose before the coupling is applied thereto, is drawn outwardly with the result that the nipple 23 is progressively and axially expanded with the result that the hose is urged axially forward toward the shoulder 17, as shown in Figure 2. During the final stages of expansion and forward compression of the hose, the exposed inner layer or tube portion 13 of the hose is forced axially outward into the cavity or recess 19 and, as the conical portion of the nipple is finally expanded against the hose material already entrapped by the prior expansion of the inner end of the nipple 23, the inner layer portion of the hose given a final and further compression in the recess 19 and against the adjacent end of the layer of solder 25.

The result is that the solder and the compressed portion of the inner layer 13 of the hose within the recess 19 provide a very effective double seal between the nipple and the shoulder 17 of the coupling body 14 and prevents the seepage of gasoline, oil and the like coming in contact with the exposed portion of the carcass 10 and outer layer or tube 12 of the hose.

Should the hose become worn out, or destroyed for any reason, it is not necessary to discard the entire coupling with the destroyed length of hose. It is only necessary to use a punch 26, or other suitable tool, to apply pressure upon the outer cylindrical portion 24 of the nipple sufficient to break the nipple free of the solder bond 25 and force the nipple out of the annular seat 21. Thus, the body portion 14 of the coupling may be reclaimed and a new nipple 23 fitted and soldered therein as originally, such as shown in Figure 1.

It is obvious that various changes and modifications may be made in the details of construction and design of the above specifically described embodiment of this invention without departing from the spirit thereof, such changes and modifications being restricted only by the scope of the following claims.

What is claimed is:

1. A soldered nipple coupling comprising a body portion having a sleeve at its inner end and provided with an abutment shoulder at the outer end of the sleeve adapted to engage the end of a hose introduced into the sleeve, an expansible nipple detachably fitted in the body portion and soldered thereto for engagement in the bore of the hose, said body portion provided with an annular inwardly and axially flaring recess between the nipple and the inner marginal edge of the abutment shoulder for the reception of the inner layer portion of the hose, said abutment shoulder being proportioned as to depth for engaging the end of the outer layer portion of the hose, the inner layer of the hose adapted to be expanded axially into said recess and to be compressed therein upon the expansion of said nipple.

2. A hose coupling comprising a body portion having an enlarged sleeve at its inner end to receive a hose and a hose abutting wall therein, said body portion having an annular seat near its forward end with a shoulder at the outer end of the seat and provided with an annular pocket at the inner end of the seat of greater diameter than the seat, an expansible nipple mounted in the body portion having an outer cylindrical end portion engaging in said annular seat with a drive fit and exposed at its extremity inwardly of said shoulder, and a body of solder disposed in said pocket about the nipple to secure the nipple in the seat, the inner end of said nipple adapted to be expanded to compress the end of a hose against said hose abutting wall.

3. A hose coupling comprising a coupling body provided at its inner end with an enlarged sleeve and having a seat in its outer end and an annular pocket extending from the inner end of said seat, said seat having an inwardly-projecting seat shoulder at its outer end, a nipple provided with an inner expansible portion and a forward cylindrical portion and an intermediate conical portion extending inwardly from said pocket, and a layer of solder in said pocket securing said nipple in the body portion, said coupling body having an abutment shoulder at the outer end of said sleeve and provided with an axially tapering wall at the inner marginal edge of the abutment shoulder forming with the intermediate conical portion of the nipple an axially tapering annular recess, said coupling adapted to receive the end of a hose in said sleeve about the inner end of the nipple and said nipple adapted to be expanded for forcing the hose end axially outward toward the abutment shoulder in the sleeve, the inner lining portion of the hose adapted to be compressed axially into the tapering recess between the conical portion of the nipple and the inner wall of the abutment shoulder.

4. A hose coupling comprising a coupling body having an enlarged sleeve on its inner end and an internal abutment shoulder at the outer end of the sleeve, said coupling body provided in its outer end with an annular seat and a cylindrical pocket at the inner end of said seat, said body portion provided with a rearwardly flaring inner wall leading from said pocket through the abutment shoulder to provide a recess opening rearwardly into the sleeve, a nipple secured with a drive fit into said seat and having an intermediate tapering portion extending rearwardly from the said pocket and terminating in a reduced inner portion for entering the bore of a hose when fitted in the sleeve, a film of solder disposed in said pocket about said nipple to secure the latter in the coupling body, said rear portion of the nipple adapted to be expanded for forcing the hose end axially outward against said shoulder and into said flaring recess about the nipple to seal the inner layer portion of the hose against the solder and seal the hose in the coupling.

5. In a hose coupling, a coupling body comprising a sleeve portion and an attaching portion and having an abutment shoulder between the portions, said attaching portion provided with a plurality of internal stepped sections, a nipple fitted into one of said stepped sections, the next immediate stepped section inwardly of the coupling being slightly larger than said nipple to provide an annular space therebetween, a film of solder disposed within said space to anchor said nipple to said coupling body; the adjacent wall surfaces of said nipple and said coupling body beyond said solder film being diverging to provide a V-shaped annular recess; and the opposite and outermost stepped section being less than the thickness of said nipple end wall whereby a substantial portion of the nipple wall end will be exposed to permit a tool to be engaged thereagainst for removing the nipple from the coupling.

6. In a coupling, a reusable coupling body having a cylindrical seat and a shoulder adjoining said seat, and a sleeve detachably received in said body and having a cylindrical portion of a diameter slightly larger than the diameter of said seat so that said portion is adapted to be driven with a drive fit into said seat and against said shoulder as a stop, said cylindrical part having an end thicker than the width of the shoulder to project inwardly of the shoulder whereby to afford an abutment face for receiving a tool thereagainst to force the sleeve out of its drive fit in said coupling body and permit another sleeve to be reassembled into said body.

7. In a coupling, a reusable coupling body having a cylindrical seat and a shoulder adjoining said seat, a sleeve detachably received in said body and having a cylindrical portion fitted into said seat and against said shoulder as a stop, and means to sealingly secure said sleeve in said body, said cylindrical portion having an end thicker than the width of the shoulder to project inwardly of the shoulder whereby to afford an abutment face for receiving a tool thereagainst to force the sleeve out of its fit in said coupling body and permit another sleeve to be reassembled into said body.

CORNELIUS D. GARRETSON.